United States Patent
Bahukudumbi et al.

(10) Patent No.: US 9,186,608 B2
(45) Date of Patent: Nov. 17, 2015

(54) PROCESS FOR FORMING A HIGH EFFICIENCY NANOFIBER FILTER

(71) Applicant: Milliken & Company, Spartanburg, SC (US)

(72) Inventors: Pradipkumar Bahukudumbi, Greenville, SC (US); Kirkland W. Vogt, Simpsonville, SC (US); James R. Theobald, Greenville, SC (US)

(73) Assignee: Milliken & Company, Spartanburg, SC (US)

( * ) Notice: Subject to any disclaimer, the term of this patent is extended or adjusted under 35 U.S.C. 154(b) by 94 days.

(21) Appl. No.: 13/934,401

(22) Filed: Jul. 3, 2013

(65) Prior Publication Data

US 2014/0083066 A1    Mar. 27, 2014

Related U.S. Application Data

(60) Provisional application No. 61/705,844, filed on Sep. 26, 2012.

(51) Int. Cl.
*B01D 46/00* (2006.01)
*B29C 71/00* (2006.01)
*B01D 39/16* (2006.01)

(52) U.S. Cl.
CPC ........ *B01D 46/0001* (2013.01); *B01D 39/1623* (2013.01); *B29C 71/0009* (2013.01); *B01D 2239/10* (2013.01); *B01D 2239/1233* (2013.01)

(58) Field of Classification Search
CPC ... B01D 46/10; B01D 39/163; B01D 39/1623
USPC .............. 55/482, 486–487, 525–528; 96/153; 442/268, 277, 409, 411, 414–415
See application file for complete search history.

(56) References Cited

U.S. PATENT DOCUMENTS

| | | | |
|---|---|---|---|
| 570,746 A | 11/1896 | Curtis et al. | |
| 3,016,599 A | 1/1962 | Perry, Jr. | 28/78 |
| 3,546,063 A | 12/1970 | Breen | 161/176 |
| 4,042,740 A | 8/1977 | Krueger | 428/138 |
| 4,100,324 A | 7/1978 | Anderson et al. | 428/288 |
| 4,118,531 A | 10/1978 | Hauser | 428/224 |
| 4,363,646 A | 12/1982 | Torobin | 65/5 |
| 4,415,512 A | 11/1983 | Torobin | 264/9 |
| 4,525,314 A | 6/1985 | Torobin | 264/9 |
| 4,536,361 A | 8/1985 | Torobin | 264/167 |
| 4,568,581 A | 2/1986 | Peoples, Jr. | 428/35 |
| 4,840,832 A | 6/1989 | Weinle et al. | 428/156 |
| 4,910,064 A | 3/1990 | Sabee | 428/113 |
| 4,931,355 A | 6/1990 | Radwanski et al. | 428/283 |
| 5,075,161 A | 12/1991 | Nyssen et al. | 428/288 |
| 5,114,631 A | 5/1992 | Nyssen et al. | 264/6 |
| 5,260,003 A | 11/1993 | Nyssen et al. | 264/6 |

(Continued)

FOREIGN PATENT DOCUMENTS

| | | |
|---|---|---|
| WO | WO 2006/108363 | 10/2006 |
| WO | WO 2009/085679 | 7/2009 |

*Primary Examiner* — Robert Clemente
*Assistant Examiner* — Karla Hawkins
(74) *Attorney, Agent, or Firm* — Cheryl J. Brickey

(57) ABSTRACT

A process for forming a high efficiency filter containing the steps of forming a non-woven layer having pores from a plurality thermoplastic fibers having a median diameter of less than about 2 micrometers, saturating the non-woven layer in a wetting liquid, and drying the wetted non-woven layer.

18 Claims, 6 Drawing Sheets

(56) References Cited

U.S. PATENT DOCUMENTS

| | | | |
|---|---|---|---|
| 5,298,694 A | 3/1994 | Thompson et al. ............ 181/286 |
| 5,503,782 A | 4/1996 | Dyrud et al. ...................... 264/6 |
| 5,582,907 A | 12/1996 | Pall .............................. 428/287 |
| 5,591,335 A | 1/1997 | Barboza et al. ............. 210/323.2 |
| 5,607,491 A | 3/1997 | Jackson et al. ................... 55/528 |
| 5,652,048 A | 7/1997 | Haynes et al. ................ 442/351 |
| 5,679,379 A | 10/1997 | Fabbricante et al. ............ 425/7 |
| 5,681,469 A | 10/1997 | Barboza et al. ............... 210/503 |
| 5,685,757 A | 11/1997 | Kirsch et al. .................. 442/344 |
| 5,733,581 A | 3/1998 | Barboza et al. .............. 425/72.2 |
| 5,773,375 A | 6/1998 | Swan et al. .................... 442/340 |
| 5,783,011 A | 7/1998 | Barboza et al. ............... 156/167 |
| 5,993,943 A | 11/1999 | Bodaghi et al. ............... 428/198 |
| 6,057,256 A | 5/2000 | Krueger et al. ............... 442/400 |
| 6,114,017 A | 9/2000 | Fabbricante et al. ......... 428/198 |
| 6,120,939 A | 9/2000 | Whear et al. .................. 429/254 |
| 6,183,670 B1 | 2/2001 | Torobin et al. .................... 264/6 |
| 6,269,513 B1 | 8/2001 | Torobin ...................... 15/104.93 |
| 6,315,806 B1 | 11/2001 | Torobin et al. ................. 55/522 |
| 6,382,526 B1 | 5/2002 | Reneker et al. ............... 239/294 |
| 6,395,046 B1 | 5/2002 | Emig et al. ...................... 55/382 |
| 6,520,425 B1 | 2/2003 | Reneker ........................ 239/294 |
| 6,524,514 B1 | 2/2003 | Volokitin et al. .............. 264/403 |
| 6,554,881 B1 | 4/2003 | Healey ............................ 55/528 |
| 6,623,548 B1 | 9/2003 | Gordon et al. ..................... 96/15 |
| 6,655,394 B1 | 12/2003 | Tanaka et al. .............. 134/22.18 |
| 6,692,868 B2 | 2/2004 | Zucker .......................... 429/144 |
| 6,695,992 B2 | 2/2004 | Reneker ........................ 264/29.1 |
| 6,743,273 B2 | 6/2004 | Chung et al. ................... 55/482 |
| 6,752,609 B2 | 6/2004 | Volokitin et al. .................. 425/8 |
| 6,800,226 B1 | 10/2004 | Gerking ....................... 264/40.3 |
| 6,827,764 B2 | 12/2004 | Springett et al. ................... 96/66 |
| 6,858,057 B2 | 2/2005 | Healey ............................ 55/528 |
| 6,893,711 B2 | 5/2005 | Williamson et al. ........ 428/297.1 |
| 6,966,939 B2 | 11/2005 | Rammig et al. ................ 55/486 |
| 7,112,389 B1 | 9/2006 | Arora et al. ................... 429/128 |
| 7,214,444 B2 | 5/2007 | Zucker .......................... 429/144 |
| 7,226,656 B2 | 6/2007 | Coates et al. ................. 428/221 |
| 7,326,663 B2 | 2/2008 | Sodemann et al. ........... 442/401 |
| 7,390,760 B1 | 6/2008 | Chen et al. .................... 442/341 |
| 7,426,776 B2 | 9/2008 | Love, III et al. ................. 28/167 |
| 7,476,632 B2 | 1/2009 | Olson et al. ................... 442/411 |
| 7,501,085 B2 | 3/2009 | Bodaghi et al. ............... 264/115 |
| 7,530,147 B2 | 5/2009 | Noelle et al. ...................... 19/299 |
| 7,618,702 B2 | 11/2009 | Frey et al. .................. 428/297.4 |
| 7,709,405 B2* | 5/2010 | Wenstrup et al. ............ 442/415 |
| 7,757,811 B2 | 7/2010 | Fox et al. ...................... 181/291 |
| 7,776,251 B2 | 8/2010 | Griffin et al. ................. 264/518 |
| 7,807,591 B2 | 10/2010 | Fox et al. ...................... 442/344 |
| 7,863,206 B2 | 1/2011 | Harrington et al. .......... 442/329 |
| 2004/0043685 A1 | 3/2004 | Goldwasser et al. ........... 442/61 |
| 2004/0206377 A1 | 10/2004 | Griffin et al. ................ 134/56 D |
| 2005/0067732 A1 | 3/2005 | Kim et al. ................. 264/172.19 |
| 2006/0012084 A1 | 1/2006 | Armantrout et al. .......... 264/465 |
| 2006/0094320 A1 | 5/2006 | Chen et al. .................... 442/340 |
| 2006/0097431 A1 | 5/2006 | Hovanec ....................... 264/465 |
| 2006/0242933 A1* | 11/2006 | Webb et al. ..................... 55/486 |
| 2006/0290031 A1 | 12/2006 | Jirsak et al. ................... 264/465 |
| 2007/0254545 A1 | 11/2007 | Martin .......................... 442/328 |
| 2008/0017038 A1 | 1/2008 | Wu ................................ 96/154 |
| 2008/0023888 A1 | 1/2008 | Brang et al. .................. 264/555 |
| 2008/0026661 A1 | 1/2008 | Fox et al. ...................... 442/344 |
| 2008/0093778 A1 | 4/2008 | Johnson et al. ............... 264/555 |
| 2008/0131615 A1 | 6/2008 | Robertson et al. ............ 427/483 |
| 2008/0173497 A1 | 7/2008 | Kalinova et al. .............. 181/290 |
| 2008/0202078 A1* | 8/2008 | Healey et al. ................. 55/341.1 |
| 2008/0230309 A1 | 9/2008 | Fox et al. ...................... 181/286 |
| 2008/0242171 A1 | 10/2008 | Huang et al. .................... 442/51 |
| 2008/0315454 A1 | 12/2008 | Angadjivand et al. ... 264/211.12 |
| 2008/0318024 A1 | 12/2008 | Angadjivand et al. ... 428/311.51 |
| 2009/0039564 A1 | 2/2009 | Krause et al. ................. 264/514 |
| 2010/0175362 A1 | 7/2010 | Stranska et al. ................. 57/402 |
| 2010/0187171 A1* | 7/2010 | Gupta ........................... 210/491 |
| 2010/0233458 A1 | 9/2010 | Sun et al. .................... 428/292.1 |
| 2010/0304108 A1 | 12/2010 | Doshi et al. ................... 428/219 |
| 2011/0232653 A1* | 9/2011 | Imashiro et al. .............. 128/863 |
| 2012/0074611 A1* | 3/2012 | Zhou et al. .................... 264/164 |

* cited by examiner

United States Patent US 9,186,608 B2

PROCESS FOR FORMING A HIGH EFFICIENCY NANOFIBER FILTER

RELATED APPLICATIONS

This application claims priority to U.S. provisional patent application 61/705,844, filed on Sep. 26, 2012. This provisional patent application is incorporated by reference in its entirety.

FIELD OF THE INVENTION

The present invention generally relates to a process for forming filter medias and filters, more particularly to a process for forming high efficiency filter medias and filters containing nanofibers.

BACKGROUND

The removal of some or all of the particulate material from air and gas streams over extended time periods is an often addressed need in both residential and industrial settings—e.g. air intake streams to the cabins of motorized vehicles, gas streams directed to gas turbines, HVAC air, aircraft cabin ventilation, clean room ventilation, furnaces, etc. These applications have varied particle removal needs (particle size, efficiency) and priorities. For example, high efficiency removal of sub-micron particles is needed in clean rooms and often high filter pressure drops are accepted. In HVAC air filter applications, life of the filter and hence pressure drop is of high priority. High backpressure on pumps and other equipment can result in equipment failure as well.

The "lifetime" of a filter is typically defined according to a selected limiting pressure drop across the filter. Since this buildup of pressure is a result of loading of dust particles, for systems of equal efficiency a longer life is typically directly associated with higher dust holding capacity. As such it is desirable to create a filter media that can perform for extended periods of time at a high efficiency level coupled with the ability to maintain a relatively low pressure drop. This invention allows for the design of a mechanical efficiency (no electrostatic charges) filter media containing nanofibers that has a very high efficiency (HEPA filtration levels) at a low pressure drop.

BRIEF DESCRIPTION OF THE FIGURES

An embodiment of the present invention will now be described by way of example, with reference to the accompanying drawings.

DETAILED DESCRIPTION

Figure 1:
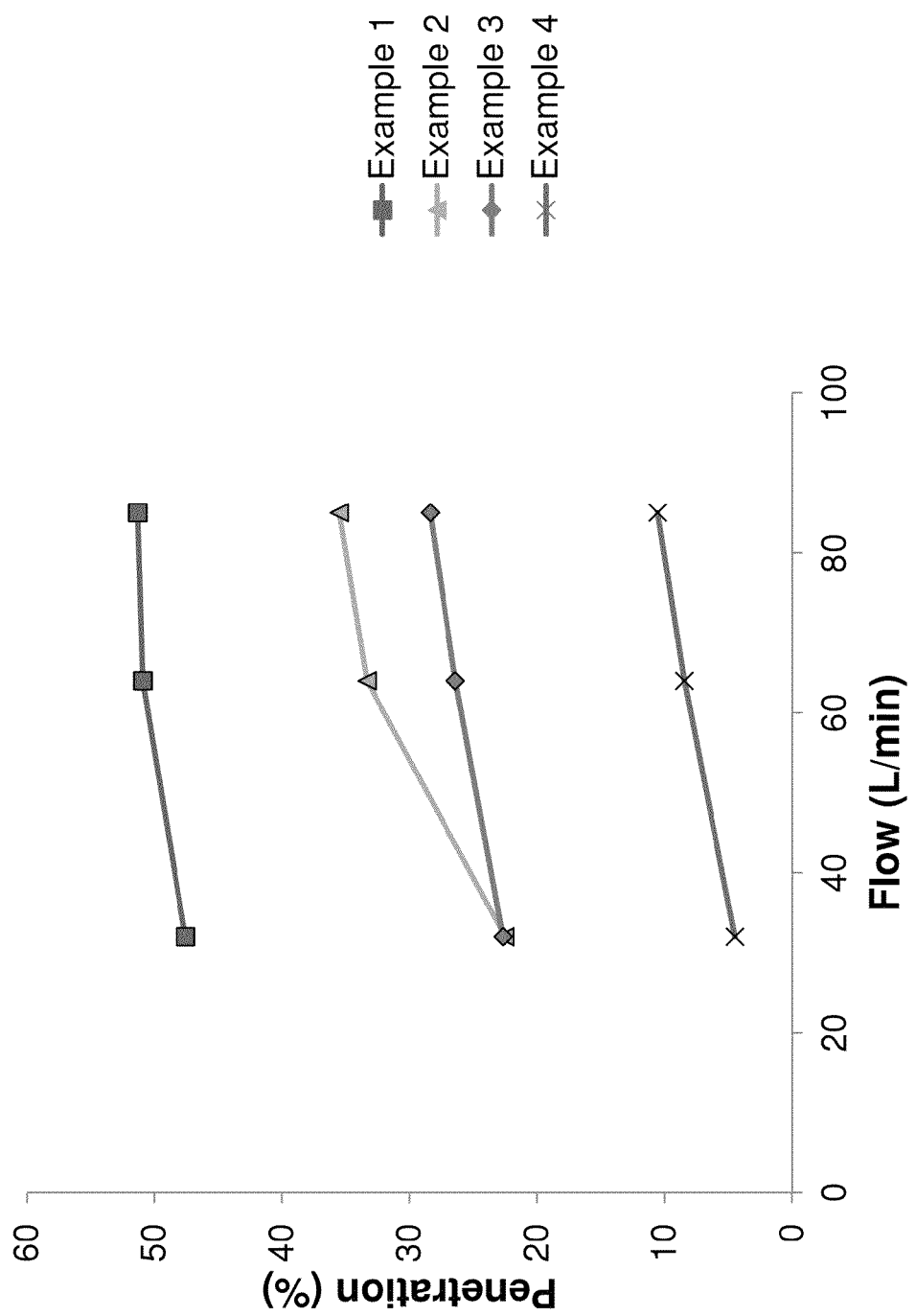
FIGS. 1-6 are graphs measuring the performance of filters.

The high efficiency filter of the invention has a number of advantages compared to the other filter medias and filters. The high efficiency filter is essentially a 100% mechanical efficiency filter. The filtration efficiency does not rely on any electrostatic charges on the fiber surface for the high efficiency of filtration. Electrostatically charged filters are susceptible to changes in the environment. For example, high humidity environments can prematurely discharge the filter, destroying the filtration efficiency. The filter has a lower pressure drop than a competitive mechanical efficiency glass media or common melt-blown material. The fiber media is glass-free, therefore there is no risk of fiberglass getting into the air during manufacture or operation. There is also little to no fiber breakage during pleating. Microglass fibers and blends containing microglass fibers are typically relatively brittle, and thus when pleated, break resulting in undesirable yield losses. Broken microglass fibers can also be released into the air by filters containing microglass fibers, creating a potential health hazard if the microglass were to be inhaled. The filtration efficiency is unchanged or even improves when tested according to ASHRAE 52.2 Appendix J. Appendix J requires the filter media to be fully discharged before efficiency testing. The filtration efficiency of electrostatically charged filter media drops significantly when tested according to Appendix J.

The process for forming the high efficiency filter begins with forming the non-woven layer. The non-woven layer contains a plurality of thermoplastic fibers having a median diameter of less than about 2 micrometers, more preferably less than about 1 micron. The high efficiency filter contains pores where the substance to be filtered passes through (for example air or water).

The nanofibers have a median diameter of less than about 1000 nm, more preferably less than about 800 nm, more preferably less than about 500 nm, more preferably less than about 300 nm, more preferably less than about 100 nm, more preferably less than about 70 nm.

In one embodiment, the density of the nonwoven 200 is preferably between about 5 g/m$^2$ and 200 g/m$^2$ either stand-alone or on a support substrate. The support substrate provides mechanical strength and makes the media pleatable. Support substrate can be spunbond, wet-laid nonwoven, spunlace etc. The nonwoven may also be used flat or be pleated. The support substrate may be attached using any known method (including but not limited to stitching, glue, binder fibers, and ultrasonic) to at least one surface of the non-woven layer. In another embodiment, the non-woven layer may be formed onto the support structure.

The type, size, and other characteristics of the nanofibers are selected to optimize the performance based on the type of material to be filtered, the nature and size of the particulates to be filtered and other performance attributes. The nanofibers may be continuous or discontinuous blown fibers or staple. The fibers may have any suitable cross-section including but not limited to circular, elliptical, regular or irregular, tape, rectangular, and multi-lobal. A partial listing of polymers for use as the thermoplastic nanofiber include, but are not limited to, polyesters (e.g., polyethylene terephthalate (PET) or glycol-modified PET (PETG)), polyamides (e.g., nylon 6 or nylon 6,6), polyethylenes (e.g., high density polyethylene (HDPE) or linear low density polyethylene (LLDPE)), polypropylenes, polystyrene, polyethylene oxide (PEO), polylactic acid, poly(1,4-cyclohexanedimethylene terephthalate) (PCT), Polybutylene terephthalate (PBT), polytetrafluoroethylene (PTFE) and combinations thereof. Nanofibers also include, but are not limited to, bicomponent binder fibers (e.g., bicomponent binder fibers comprising a thermoplastic sheath) and thermoplastic binder fibers having a relatively low melt flow rate. The non-woven layer may contain nanofibers of different thermoplastic polymers. The nanofibers in the non-woven layer may also have additives and/or coatings that enhance the performance of the nanofiber, such as nucleating agents, blooming additives to modify surface properties, UV stabilizers, antioxidants, anti-bacterial agents, etc.

The nanofibers may be made in any manner able to produce thermoplastic nanofibers. One method to produce suitable nanofibers is melt-film fibrillation. Melt-film fibrillation is a high throughput process that extrudes a film or film tube which is fibrillated into small fibers via a high velocity gas. Near the exit of the slot or nozzle, high velocity gas shears the film against the tube or slot wall and fibrillates the polymer. By tuning the polymer flow, gas velocities, and nozzle geometry, the process can be used to create uniform fibers with diameters down to less than 500 nanometers in diameter, or even less than about 300 nm.

Two technologies using fibrillation have been developed which both utilize a round coaxial nozzle concept. The first is nanofibers by gas jet disclosed in several patents (U.S. Pat. No. 6,382,526, U.S. Pat. No. 6,520,425, and U.S. Pat. No. 6,695,992 all of which are incorporated by reference). The first technology uses a coaxial design, which also can include multiple coaxial tubes to add a surrounding "lip-cleaning" air, as well as multiple film tubes and multiple air streams.

The second technology utilizes an array of nozzles using a melt-film fibrillation process, disclosed in several patents (U.S. Pat. No. 6,183,670 and U.S. Pat. No. 6,315,806 all of which are incorporated by reference). This technology uses round coaxial nozzles with a central air stream and an outer film tube. Molten polymer is fed into an array of these round nozzles with polymer melt and causing some nozzles to produce fine fiber (below 1 micron in diameter) and some to produce larger fiber (greater than 1 micron in diameter).

Additionally, there is a variation on the technologies that use a film or slot form (U.S. Pat. No. 6,695,992). Conceptually, the process is an opened or "infinite" version of the film tube. The molten polymer is fed through one or more slots and has fibrillating gas streams and "lip-cleaning" streams essentially parallel to the film slot. A film sheet can then be extruded through a slot with a gas stream shearing the film against the lip and fibrillating the sheet into fine fibers.

Several other processes exist for making thermoplastic fibers with diameters below 1 micron. These processes include several of interest for this invention, including "electro-spinning", "electro-blowing", "melt-blowing", "melt-film fibrillation", "nanofiber by gas jet", "melt fiber bursting", "spinning melt" and "bicomponent" fibers (e.g. islands-in-sea, segmented pie). While these processes all produce fibers with submicron diameters, various fiber parameters may be unique to a particular process, such as processible materials, maximum throughput, average diameter and distribution, and fiber length. The nanofibers produced may be further processed into yarns, ropes, tapes, knits, woven or nonwoven fabric constructions.

The formed non-woven layer contains no electrostatic charge. Having no electrostatic charge means that the filter media or filter is not intentionally electrostatically charged. The web architecture and the electrostatic nature of the surface of the polymer fibers in the filter media affect the filtration efficiency of the media against fine particles in the air stream. The electrostatic charge is dependent on the chemical nature of the polymer composition, the molecular conformation within the fiber, and the surface nature of the fibers made from it. Generally, filter microfibers are subjected to a surface treatment to increase their electrostatic charge or polar nature. The 'insulating' fiber forming polymers have high resistivity and are often 'electretized' to possess permanent dielectric polarization or to possess an 'electret surface. Electrets are often referred to as having a permanent dielectric polarization, which is associated with a surface charge. The electrostatic charge or permanence of surface polar nature often decays with time. The usefulness of electret enhanced filtering is therefore dependent on how permanent the electret nature is, in relation to the time span for use of the filter. To avoid a change in the minimum filtration efficiency with time, the filter media is preferably non-charged. The filtration mechanism is essentially entirely mechanical in nature.

Next, the formed non-woven layer is saturated using a wetting liquid. The wetting liquid is any suitable solvent to wet out the nanofibers of the nonwoven layer. Preferably, the wetting liquid should have a low surface tension, preferably lower than that of the thermoplastic that forms the nanofibers. In one embodiment, the wetting liquid is selected from the group consisting of isopropanol, ethanol, methanol, dimethylformamide (DMF), alcohol, and mixtures of the preceding with water. The wetting liquid completely wets and saturates the pores in the non-woven layer.

The wetting liquid may be applied in any suitable manner such as, but limited to solvent coating in a continuous or discontinuous method, roller coating, air knife coating, dip coating, rod coating, electrostatic coating, slide hopper coating, extrusion coating, blade coating, curtain coating, and slide coating. Preferably, the filter media is run through a bath containing the wetting liquid at a controlled rate to allow complete saturation (filling) of all the pores in the filter media with the solvent.

Next, the wetted non-woven layer is dried. The solvent is preferably allowed to evaporate from the fibrous web with no additional heat or pressure. The rate of evaporation/removal depends on the vapor pressure of the wetting liquid. In general, for a liquid to wet the surface of a solid, the surface tension of the liquid must be lower than the solid surface tension. Surface roughness in the filter media can affect wetting. Rougher surfaces allow the wetting liquid to "dive in" and mechanically interlock with the fibrous network. The drying step removes the wetting liquid contained in the pores of the wetted non-woven layer at a defined rate changing the morphology of the pores (in size and/or shape). The drying may be conducted at room temperature or at an elevated temperature and at atmospheric pressure or under a vacuum.

The wetted non-woven layer may be dried under tension or no tension and may be dried in a vertical orientation or horizontal orientation. When the Isopropyl alcohol (IPA) liquid (or other wetting liquid) contacts a charged fiber surface, it forms a thin film on the surface of the fiber. Any static charge, which is in proportion to the surface charge density is transferred to the IPA (wetting liquid). When the IPA liquid is removed from the filter media by an external force such as gravity or by natural evaporation, any static charge contained in it is removed from the fiber surface. The total amount of static charge on the charged fiber reduces, therefore the fiber charge density also decreases. Eventually, both the negative and positive static charges on the fiber surface are reduced to 0 V. As the original nonwoven media had no electrostatic charges on the fiber surface, it is expected to not contain any surface charge after being saturated with the wetting liquids.

The resultant dried non-woven layer may be used as a filter (or may have subsequent method steps applied to form it into a filter). The resultant filter has a higher filtration efficiency and lower pressure drop than a filter formed from an untreated non-woven layer. While not being bound to a theory, it is believed that nanofibers formed at the exit of the die are carried by a turbulent air-stream onto a collection belt to form a three-dimensional non-woven web with randomly oriented fibers. The non-woven web often contains fiber-bundles induced by roping of individual fibers together in the air stream. The pore size and the variation of web uniformity increase as roping increases, thereby reducing the filtration efficiency of the media. In addition, the nonwoven web can contain fiber shot induced pin-holes. Shots are unattenuated or partially attenuated polymer beads that will, depending on their size and temperature, melt the existing or in-coming fibers surrounding them when they land on the collector, which results in pin holes through the fabrics. The presence of pin holes in the filter media will reduce the filtration efficiency (particles you are trying to filter will flow through the pin holes).

A low surface tension liquid is used to saturate all the pores in a three-dimensional non-woven media. In the presence of no external forces (temperature, gravity), the rate of evaporation of the wetting liquid is dictated by the vapor pressure of the liquid. The slow evaporation of the liquid from the pores provides the driving force for the redistribution of fibers in three-dimensions into a more uniform and optimized arrangement (think of fibers swimming in a sea of wetting liquid). This redistribution of fibers can allow through pin-holes to be closed, fiber bundles induced by roping to be separated into individual fibers, and improve the overall uniformity of the web. The resulting nonwoven will have a more uniform distribution of smaller pores and minimize the number of larger pores. Accelerated drying in a turbulent air stream or using a rapidly evaporating wetting liquid may not allow redistribution of the fibers in the nonwoven.

The non-woven layer may have further processes for forming the high efficiency filter including but not limited to pleating of the non-woven layer and adding a framing to the non-woven layer. The nonwoven filter media of the invention can be fabricated into any desired filter format such as cartridges, flat disks, canisters, panels, bags and pouches. Within such constructions, the media can be substantially pleated, rolled or otherwise positioned on support structures. The filtration medium of the invention can be used in virtually any conventional structure including flat panel filters, oval filters, cartridge filters, spiral wound filter structures and can be used in pleated, Z-filter, V-bank or other geometric configurations involving the conversion of the medium to useful shapes or profiles. Preferred geometries include pleated and cylindrical patterns.

This filter media is especially useful for high efficiency extended surface area pocket and rigid cell particulate air filters. These filters have a filtration efficiency greater than MERV 11 (Minimum Efficiency Reporting Value; efficiency of filtering particles in the 0.3-1 μm range greater than 60%). The filter media are also useful in high beta ratio (>50) liquid filter bags and cartridges. Efficiency (%)=(βx=1)/βx100. (Where β equals the desired Beta Value for particle size x). Beta ratios of 50 and 100 are most frequently used for process liquid filtration. Beta ratios of 200 and 1000 are more common for microbiological contaminant removal for food, beverage and potable water applications.

In one embodiment, the non-woven layer also contains fibers that are larger than nanofibers forming a blend of two or more size ranges of fibers. In one embodiment, the non-woven layer contains both nanofibers and micron sized fibers. The micron and nano fibers may be of the same polymer type or different and may have the same or different lengths. The nanofibers and micron-sized may be any suitable polymer type, for example the nanofibers may be polypropylene and the micron-sized fibers may be polypropylene, polyethylene, or polyester.

One example of micron-sized fibers are meltblown fibers. Meltblowing is a process of making fibrous webs, wherein high velocity air blows a molten thermoplastic polymer through a series of holes at the die tip onto a conveyor or take up screen to form a nonwoven web comprising 2-10 μm diameter fibers. Another example of micron-sized fibers is staple fibers which are traditionally used to make spun yarns or carded into nonwoven webs. The process used to make staple fibers consists of the following steps—Extrusion or spinning, drawing, crimping and packaging. Polypropylene staple fibers are usually between 15 and 40 μm in diameter and several inches long.

In another embodiment, the non-woven layer also contains binder fibers. These binder fibers may be a separate fiber or the nanofibers may serve as binder fibers. The binder fibers are fibers that form an adhesion or bond with the other fibers. Binder fibers can include fibers that are heat activated. Examples of heat activated binder fibers are fibers that can melt at lower temperatures, such as low melt fibers, bi-component fibers, such as side-by-side or core and sheath fibers with a lower sheath melting temperature, and the like. In one embodiment, the binder fibers are a polyester core and sheath fiber with a lower melt temperature sheath. A benefit of using a heat activated binder fiber as the binder fiber in the nanofiber nonwoven layer, is that the layer can be subsequently molded to part shapes for specialty filters. The binder fibers are preferably staple fibers.

Any other suitable fiber may also be used in the nanofiber nonwoven 10 in addition to the nanofibers 30. These may include, but are not limited to a second type of nanofiber fiber having a different denier, staple length, composition, or melting point, and a fire resistant or fire retardant fiber. The fiber may also be an effect fiber, providing benefit a desired aesthetic or function. These effect fibers may be used to impart color, chemical resistance (such as polyphenylene sulfide fibers and polytetrafluoroethylene fibers), moisture resistance (such as polytetrafluoroethylene fibers and topically treated polymer fibers), or others. In one embodiment, the nanofiber nonwoven 10 contains fire resistant fibers. As used herein, fire retardant fibers shall mean fibers having a Limiting Oxygen Index (LOI) value of 20.95 or greater, as determined by ISO 4589-1. Types of fire retardant fibers include, but are not limited to, fire suppressant fibers and combustion resistant fibers. Fire suppressant fibers are fibers that meet the LOI by consuming in a manner that tends to suppress the heat source. In one method of suppressing a fire, the fire suppressant fiber emits a gaseous product during consumption, such as a halogenated gas. Examples of fiber suppressant fibers include modacrylic, PVC, fibers with a halogenated topical treatment, and the like. Combustion resistant fibers are fibers that meet the LOI by resisting consumption when exposed to heat. Examples of combustion resistant fibers include silica impregnated rayon such as rayon sold under the mark VISIL®, partially oxidized polyacrylonitrile, polyaramid, para-aramid, carbon, meta-aramid, melamine and the like.

Any or all of the fibers in the non-woven layer may additionally contain additives. Suitable additives include, but are not limited to, fillers, stabilizers, plasticizers, tackifiers, flow control agents, cure rate retarders, adhesion promoters (for example, silanes and titanates), adjuvants, impact modifiers, expandable microspheres, thermally conductive particles, electrically conductive particles, silica, glass, clay, talc, pigments, colorants, glass beads or bubbles, antioxidants, optical brighteners, antimicrobial agents, surfactants, fire retardants, and fluoropolymers. One or more of the above-described additives may be used to reduce the weight and/or cost of the resulting fiber and layer, adjust viscosity, or modify the thermal properties of the fiber or confer a range of physical properties derived from the physical property activity of the additive including electrical, optical, density-related, liquid barrier or adhesive tack related properties.

In one embodiment, the percentages of the fiber blend being nanofibers is between about 2 and 98%, more preferably about 10 and 90%, more preferably about 20 and 80%, more preferably about 30 and 70%, more preferably about 20 and 60%, more preferably about 30 and 50% with the remainder being micron-sized fibers. In one embodiment, the ratio by weight of the nanofiber to micron-sized fiber is between 20:80 and 80:20, more preferably between 30:70 and 65:35.

Scrims (or other textiles such as an additional non-woven, woven, or knit layer) may be added to the non-woven layer to give the resultant filter additional structural strength. These additional textile layers may be formed of the same or different materials, often including materials made with very open mesh or weave structures of very high tensile fibers. These additional textile layers can be constructed to provide support in the machine, cross machine, and diagonal directions in relation to the porous web. Advantageously, the scrim layers are spunbond (SB) nonwoven layers, but the scrim layers may also be carded, wet laid, meltblown or otherwise formed and consolidated webs of nonwoven polymeric and/or natural fibers, woven polymeric and/or natural fiber fabrics and the like. The scrim layers require sufficient stiffness to hold pleats and dead folds. Particularly high stiffness can be achieved by using an acrylic bonded carded or wet laid scrim comprising large denier staple fibers. The scrim layers may be multi-layered fabrics, such as laminates of layers of carded PET or nylon fibers. In another preferred embodiment, the nanofiber layer could be positioned between two support scrim layers (Scrim-Nanofiber-Scrim construction). The two scrim layers can be the same, or can differ as to basis weight, fiber composition or formation technique.

Examples

The filter was created by first forming a non-woven layer containing nanofibers. The nanofibers were formed using the nanofibers by Gas Jet (NGJ) process (also described in U.S. Pat. No. 6,695,992 incorporated herein by reference). The thermoplastic polymer used to form the thermoplastic nanofibers in each example was an ultra-high melt flow rate polypropylene (PP) homopolymer, with a very narrow molecular weight distribution (Metallocene-based Achieve™ 6936G1, from ExxonMobil Chemical USA, MFR=1550 gram/10 min, measured using ASTM D1238 or Basell MF650Y, MFR=1800 gram/10 min). The melting point of the polypropylene resin was $T_m$=158° C.

An extruder with a gear pump was used to deliver the polymer melt to the slot die through a supply hose. The extruder temperature was 625° F. and the temperature of the polymer melt in the supply hose was 629° F. The slot die was heated to 625° F. using cartridge heaters. A source of pressurized air was fed from an air supply line to the inlet of the die via air-tight connectors, and the volume of compressed air entering the die was recorded using a flow meter. The pressurized air was introduced at 40 psi and at an air temperature of 625° F.

A non-woven layer was collected on a collection belt that was held in place a set number of inches from the exit of the die. Increasing the collection distance resulted in a nonwoven web with higher loft (thickness, lower density). Non-woven layers were formed at 30 g/m$^2$, 50 g/m$^2$, 80 g/m$^2$, and 100 g/m$^2$.

Next, each non-woven layer was placed in a bath containing a wetting liquid. Enough time was given for the wetting liquid to fully saturate the pores in the non-woven web. The wetting liquids used was isopropyl alcohol, methanol, and ethanol. The nonwoven samples were placed in the liquid bath for 15 minutes. The time taken to achieve full volume saturation will depend on the basis weight of the web and density.

Once the non-woven layer was saturated, the wetted nonwoven layers were allowed to dry either at room temperature (23° C.) for 24 hours. The non-woven layer was oriented in a vertical or horizontal orientation when dried. Vertical orientation=dried while hanging, all sides of the nonwoven exposed to airflow in the hood; Horizontal orientation=sample resting against a solid surface, only the top side of the nonwoven exposed to air flow. The table below summaries the details of each Example:

|        | Density of non-woven layer (g/m$^2$) | Wetting liquid | Drying orientation |
|--------|--------------------------------------|----------------|---------------------|
| Ex. 1  | 50  | none       | Vertically   |
| Ex. 2  | 50  | IPA        | Vertically   |
| Ex. 3  | 100 | none       | Vertically   |
| Ex. 4  | 100 | IPA        | Vertically   |
| Ex. 5  | 30  | none       | Vertically   |
| Ex. 6  | 30  | IPA- water | Vertically   |
| Ex. 7  | 30  | MeOH- water| Vertically   |
| Ex. 8  | 30  | EtOH- water| Vertically   |
| Ex. 9  | 80  | none       | Vertically   |
| Ex. 10 | 80  | IPA- water | Vertically   |
| Ex. 11 | 80  | MeOH- water| Vertically   |
| Ex. 12 | 80  | EtOH- water| Vertically   |
| Ex. 13 | 80  | IPA- water | Horizontally |
| Ex. 14 | 80  | MeOH- water| Horizontally |

Filtration Efficiency Measurements

The filtration efficiency of the filter medias formed was measured using an 8130 automated filter testing unit from TSI, Inc. equipped with a sodium chloride generator. The average particle size created by the salt particle generator was 0.26 micron mass mean diameter or 0.07 micron count mean diameter. The instrument measured a pressure drop across the filter media and the resultant penetration value on an instantaneous basis at a flow rate less than or equal to 115 liters per minute (lpm). The 8130 is able to be run in a continuous mode with one pressure drop/penetration reading approximately every minute. All references herein to NaCl efficiency (or penetration) represent challenging a 100 cm$^2$ media sample at a flow rate of 32 lpm (face velocity of 5.3 cm/sec). Samples washed with methanol-water mixtures and held horizontally when air dried reached HEPA level efficiencies (99.97% efficient against 0.3 micron size particles). All washed samples showed an enhancement in filtration efficiency when compared to the unwashed samples.

FIG. 1 is a graph showing penetration (%) versus flow (L/min) of Examples 1-4. As can be seen from the graph, comparing the filter medias that were not washed (Examples 1 and 3) to the filter medias that were washed in 100% IPA and (dried vertically, the filtration efficiency significantly increases after washing with IPA.

Figure 2:
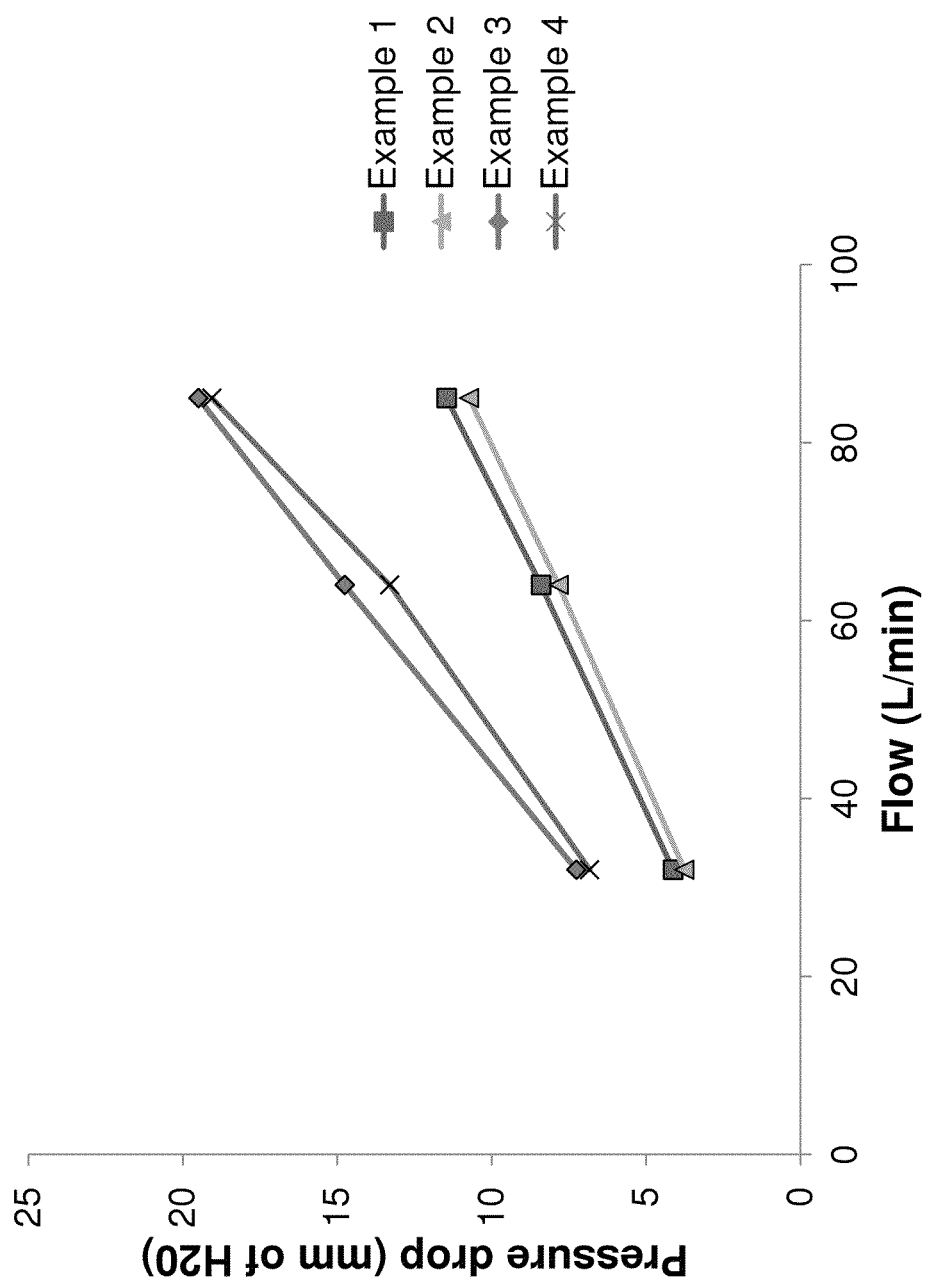

FIG. 2 is a graph showing pressure drop (mm of H$_2$O) versus flow (L/min) of Examples 1-4. As can be seen from the graph, comparing the filter medias that were not washed (Examples 1 and 3) to the filter medias that were washed in 100% IPA and dried vertically, the pressure drop decreases after an IPA wash indicating that there are morphological changes in the non-woven layer.

Figure 3:
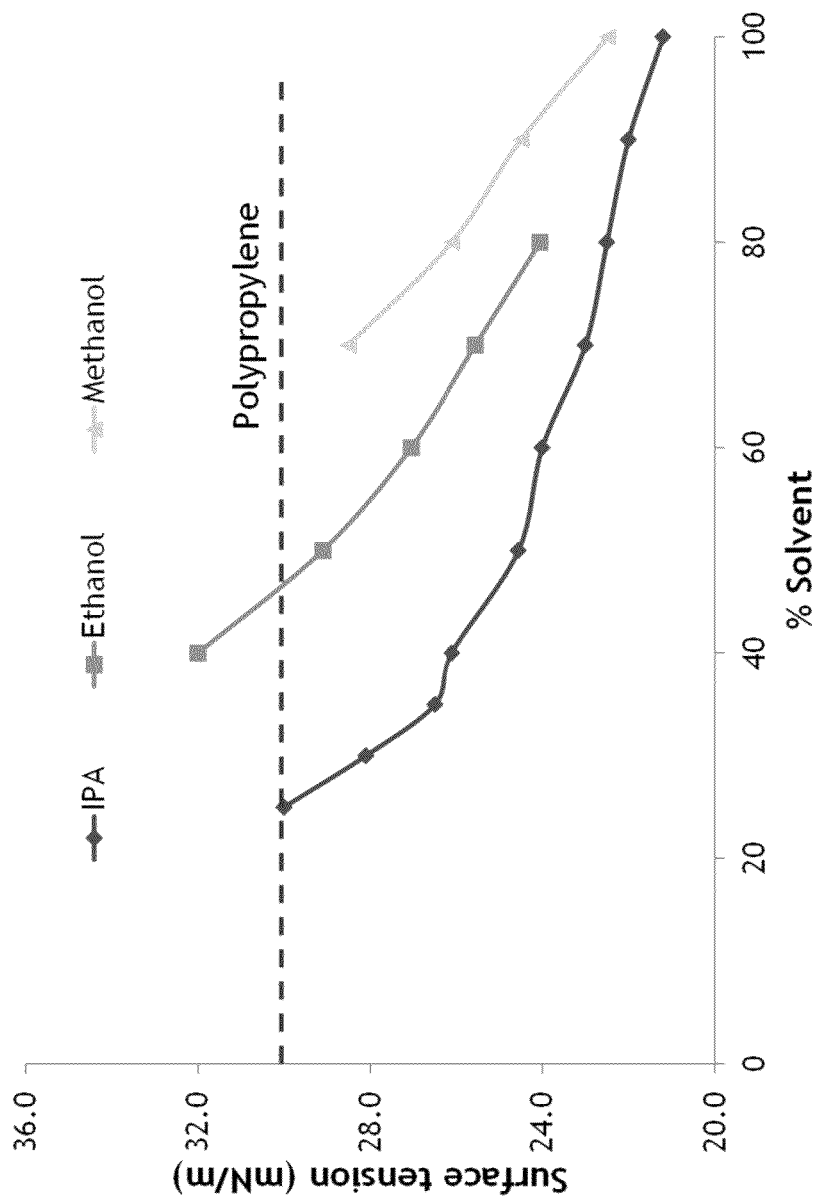

FIG. 3 is a graph showing the surface tension of various wetting liquids as compared to polypropylene. The % solvent indicates that % by volume of the wetting liquid of the whole liquid that the non-woven layer is saturated with. 100% indicates that the liquid that saturated the non-woven layer was 100% the wetting liquid. For percentages less than 100%, the remainder was water.

Figure 4:
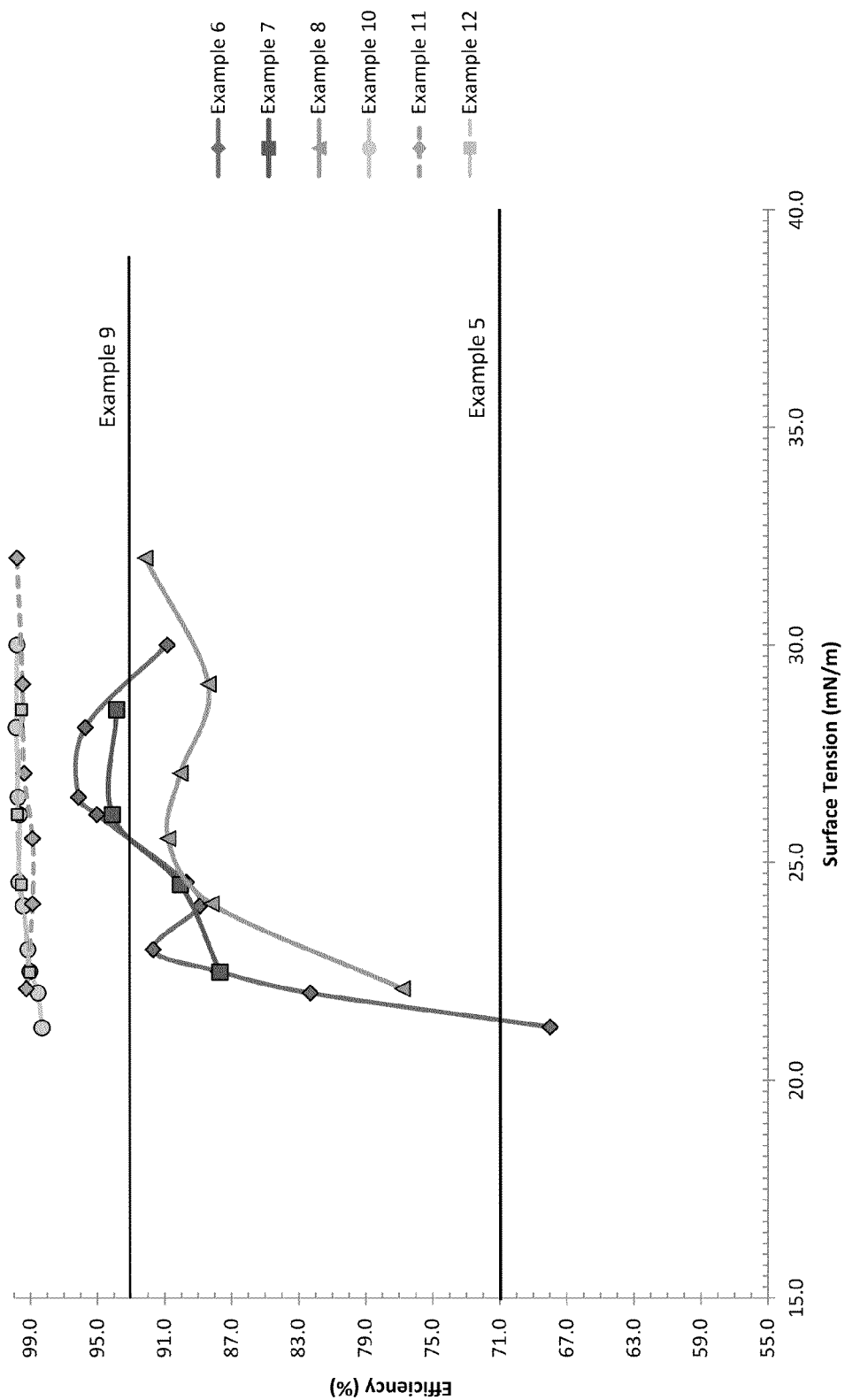

FIG. 4 is a graph showing efficiency (%) versus surface tension (mN/m) for Examples 5-12. The surface tension ranges of the various solvents were created by diluting the wetting liquid with water. As can been seen, Examples 5 and 9 which were not washed had much lower efficiencies over the entire surface tension range than Examples 6-8 and 10-12 which were washed with wetting liquids.

Figure 5:
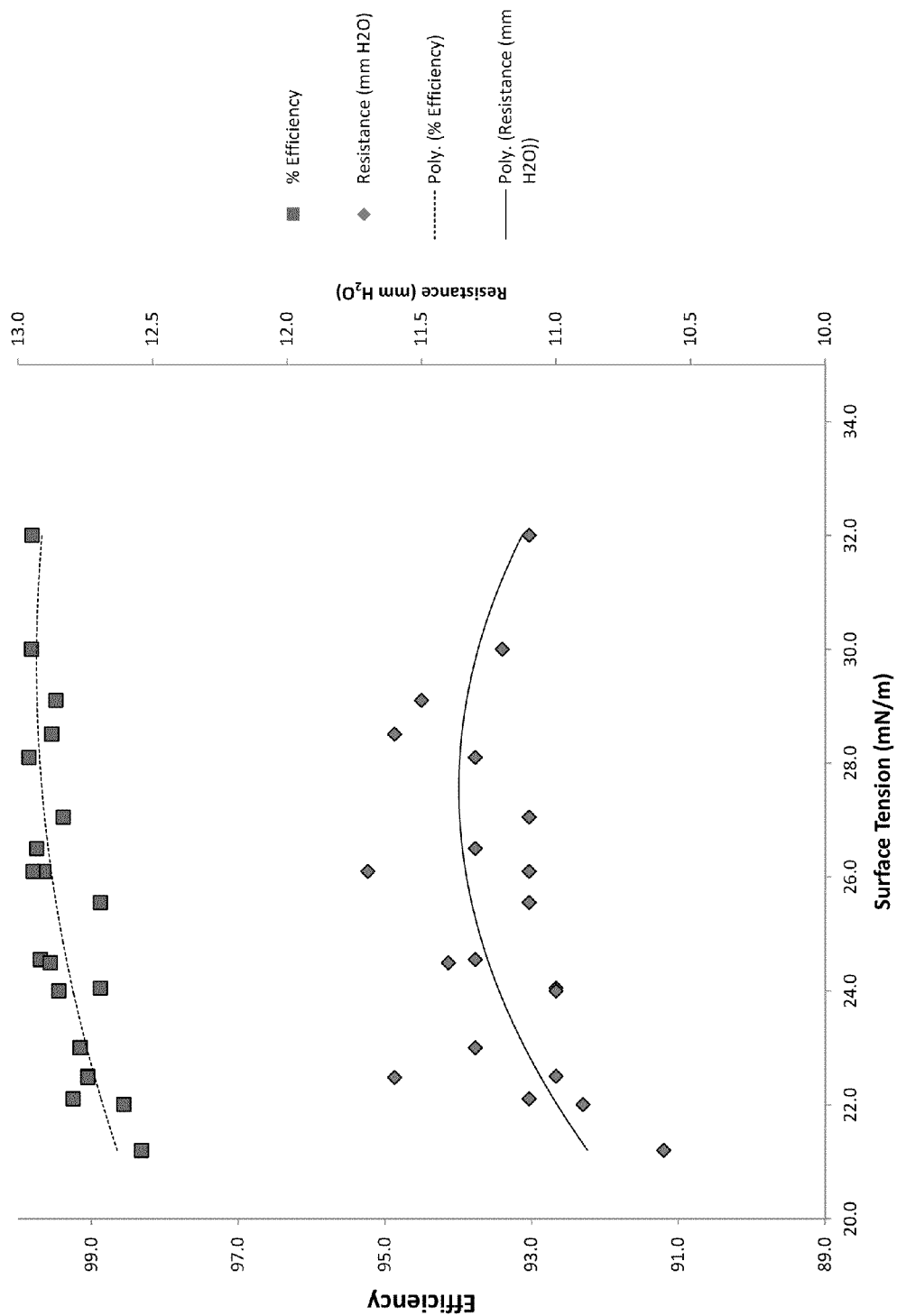
Figure 6:
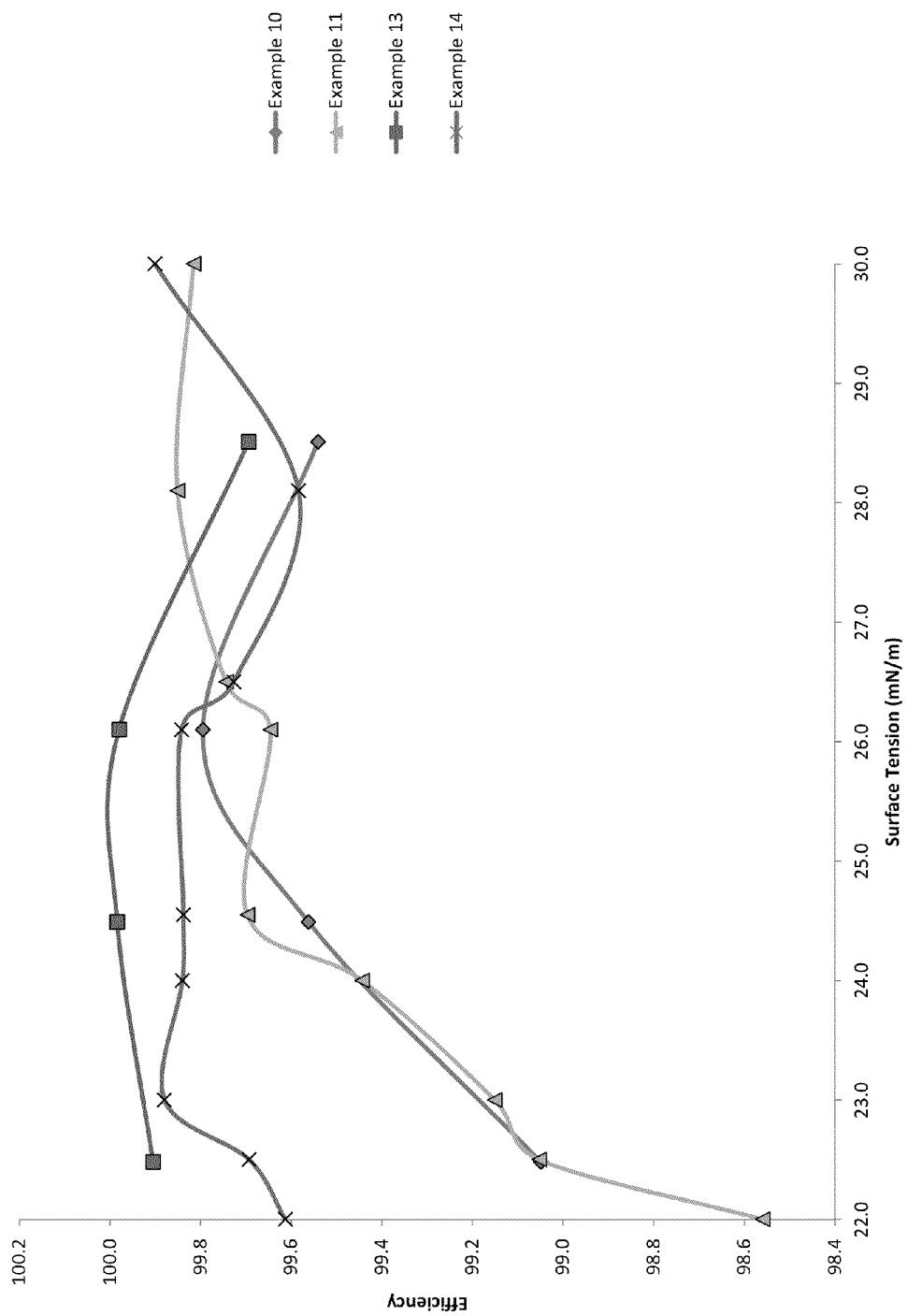

FIG. 5 is a master curve of filtration efficiency versus surface tension for a 80 g/m² nanofiber web that was washed in different surface tension liquids (composite curve containing data of methanol-water, ethanol-water and IPA-water washes). The control un-washed sample had a filtration efficiency of 93% and a pressure drop of 11 mm of water. The lines in the figure are polynomial curve fits. FIG. 6 shows the effect of vertical versus horizontal drying on the filter medias. The graph compares an 80 g/m² filter washed with IPA-water mixtures dried at room temperature horizontally (Example 13) to vertically (Example 10) and an 80 g/m² filter washed with MeOH-water mixtures dried at room temperature horizontally (Example 14) to vertically (Example 11). In almost all of the surface tensions tested, the horizontal drying had higher filtration efficiency.

The filter media of Example 15 was created by first forming a nonwoven layer containing micron-sized fibers. The fibers were formed using a 0.5 meter wide Reifenhäuser Melt Blowing die (805 holes, 0.4 mm in diameter). The thermoplastic polymer used to form the thermoplastic nanofibers in each example was an ultra-high melt flow rate polypropylene (PP) homopolymer, with a very narrow molecular weight distribution (Metallocene-based Achieve™ 6936G1, from ExxonMobil Chemical USA, MFR=1550 gram/10 min). The melting point of the polypropylene resin was $T_m=158°$ C. The temperature of the air and polymer was set to 480 F and the throughput per hole was 0.4 gm/hole/min. A 50 g/m² nonwoven layer was formed on a collection belt. The median fiber diameter in the nonwoven web was 1.76 µm.

The pressure drop of the filter media at 32 L/min flow-rate was 8.2 mm and the TSI 8130 filtration efficiency was 63.72%. The media was placed in a bath containing IPA and allowed to dry in a vertical orientation in the hood for 24 hours. The pressure drop of the solvent washed sample was 8 mm and the filtration efficiency increased to 81%. This is consistent with our observations with the filter media containing nanofibers (median diameter less than 1000 nm).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A process for forming a high efficiency filter comprising:
   forming a non-woven layer having pores from a plurality of thermoplastic fibers having a median diameter of less than about 2 micrometers, wherein the formed non-woven layer contains no electrostatic charge;
   saturating the non-woven layer in a wetting liquid, wherein the wetting liquid has a surface tension of less than the surface tension of the thermoplastic making up the thermoplastic nanofibers, wherein the wetting liquid completely wets the pores in the non-woven layer;
   drying the wetted non-woven layer forming a dried non-woven layer at room temperature such that size and shape of at least a portion of the pores change, wherein the dried non-woven layer has higher filtration efficiency than the formed non-woven layer, and wherein the dried non-woven layer contains no electrostatic charge.

2. The process of claim 1, wherein the thermoplastic fibers have a median diameter of less than about 1 micrometers.

3. The process of claim 1, wherein the thermoplastic fibers have a median diameter of less than about 100 nanometers.

4. The process of claim 1, wherein the thermoplastic fibers have a median diameter of less than about 70 nanometers.

5. The process of claim, wherein the formed non-woven layer further comprises a plurality of micron-sized fibers.

6. The process of claim 1, wherein the wetting liquid is selected from the group consisting of isopropanol, ethanol, methanol, DMF, alcohol/water mixtures, and mixtures thereof.

7. The process of claim 1, wherein the formed non-woven layer further comprises a plurality of binder fibers.

8. The process of claim 1, wherein the formed non-woven layer further comprises a plurality of fire resistant or fire retardant fibers.

9. The process of claim 1, wherein the forming the non-woven layer further comprises attaching a support substrate to at least one surface of the non-woven layer.

10. The process of claim 1, wherein the formed non-woven layer has a density of between about 5 and 200 g/m².

11. The process of claim 1, wherein the drying of the wetted non-woven layer comprises drying the wetted non-woven layer in a horizontal orientation.

12. The process of claim 1, wherein the drying of the wetted non-woven layer comprises drying the wetted non-woven layer in a vertical orientation.

13. The process of claim 1, wherein the thermoplastic fibers comprise a polymer are selected from the group consisting of polypropylene, polyester, polybutylene terephthalate, and polyethylene.

14. The process of claim 1, wherein the dried non-woven layer has a filtration efficiency of greater than MERV 11.

15. The process of claim 1, wherein the dried non-woven layer has lower pressure drop efficiency than the formed non-woven layer.

16. The process of claim 1, wherein the process further comprises pleating the filter.

17. The process of claim 1, wherein the process further comprises placing the filter in a frame.

18. A high efficiency filter formed from the method of claim 1.

\* \* \* \* \*